United States Patent [19]

Ichikawa et al.

[11] 3,887,536
[45] June 3, 1975

[54] PROCESS FOR PREPARING POLY-1,4-TRANS BUTADIENE

[75] Inventors: Masaru Ichikawa; Tamio Noguchi, Sagamihara, both of Japan

[73] Assignee: Sagami Chemical Research Center, Tokyo, Japan

[22] Filed: June 1, 1973

[21] Appl. No.: 365,826

[30] Foreign Application Priority Data
June 9, 1972  Japan.................................. 47-56892
Aug. 24, 1972  Japan................................ 47-84095

[52] U.S. Cl. ............................................. 260/94.2
[51] Int. Cl. ............................................. C08d 3/08
[58] Field of Search................... 260/94.2 M, 94.2 T

[56] References Cited
UNITED STATES PATENTS

| | | | |
|---|---|---|---|
| 2,965,624 | 12/1960 | Anderson...................... | 260/94.2 M |
| 3,451,988 | 6/1969 | Langer.......................... | 260/94.2 M |
| 3,488,340 | 1/1970 | Hiraoka et al. ............... | 260/94.2 M |
| 3,663,634 | 5/1972 | Morton et al. ................ | 260/94.2 M |

*Primary Examiner*—Joseph L. Schofer
*Assistant Examiner*—Maria S. Tungol
*Attorney, Agent, or Firm*—Browdy and Neimark

[57] ABSTRACT

Poly-1,4-trans butadiene is prepared by polymerizing butadiene in the presence of a catalyst consisting of either an alkali metal and alkylamine or alkenylamine, or of an alkali metal, graphite and alkylamine or alkenylamine. The resulting polymer is used for making films or fibers.

2 Claims, 2 Drawing Figures

PROCESS FOR PREPARING POLY-1,4-TRANS BUTADIENE

BACKGROUND OF THE INVENTION

1. Field of the Invention

This invention relates to a new process for preparing poly-1,4-trans butadiene comprising polymerizing butadiene in the presence of a catalyst consisting of either an alkali metal and an alkylamine or an alkenylamine, or of an alkali metal, graphite and an alkylamine or an alkenylamine.

2. Description of the Prior Art

A formation of polybutadiene having 1,2-structure and trans-1,4-structure in a solvent such as n-hexane or THF (tetrahydrofuran) using metallic potassium or a complex consisting of graphite and potassium has been found as the prior art (see the following Table 2). However, the amount of the formed polymer having trans-1,4-structure in accordance with the prior processes only at most about 40 percent. It has also been found by the inventors that the selectivity of forming trans-1,4-structure of polybutadiene can be increased to 60 to 70 percent when a polymerization of butadiene is carried out in THF or n-hexane by adding an alkylamine to a graphite-potassium (see Japanese Patent Application No. 103211/1971). However, according to the process the product of the polymerization was no more than a mucilage-like substance having a degree of polymerization of as low as 4,000 in molecular weight.

OBJECTS AND SUMMARY OF THE INVENTION

It is an object of the present invention to provide a new process for preparing polybutadiene mostly in excess of 90 percent of the selectivity in the form of trans-1,4-structure.

Another object of the present invention is to provide a process for preparing poly-1,4-trans butadiene in excess of 60 percent of the crystallinity thereof.

Still another object of the present invention is to provide a process for preparing polybutadiene suitable for making films or fibers.

Said objects together with others, plus many advantages of the present invention will become apparent to those skilled in the art from the specification and claims which will follow hereunder.

Thus, this invention relates to a polymerizing process, characterized in that poly-1,4-trans butadiene is selectively prepared by polymerizing butadiene in the presence of a catalyst consisting of either an alkali metal, such as sodium, potassium, rubidium or cesium, and alkylamine or alkenylamine, or of an alkali metal, graphite and alkylamine or alkenylamine in the absence of a solvent under reduced pressure or in an inert gas atmosphere at a temperature of from −20° to 70°C at the weight ratio of an alkali metal to alkylamine or alkenylamine being about 1 : 10–10 : 1, while at the weight ratio of an alkali metal-graphite complex to alkylamine or alkenylamine being about 1 : 10–10 : 1.

DETAILED DESCRIPTION OF THE INVENTION

Figure 1:
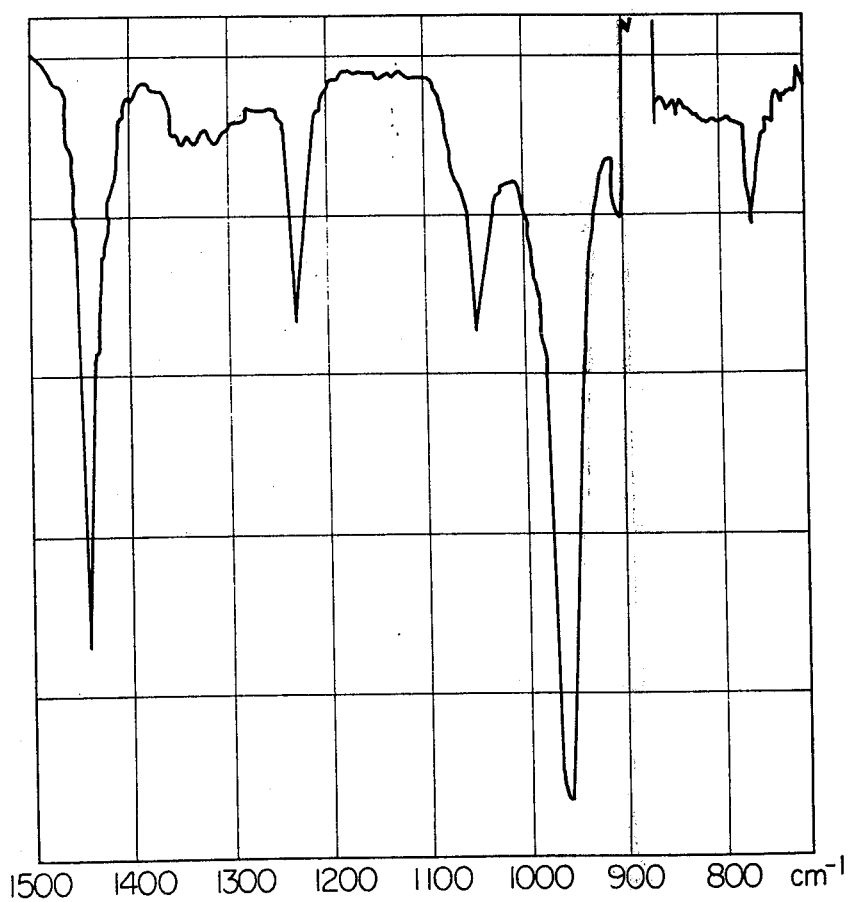
FIG. 1 shows the analytical results obtained by means of carrying out an infrared spectrum process proposed by D. Morero et al. (refer to La Chimica e Industria XLI-8-1959, 758p) as to poly-1,4-trans butadiene obtained by the method illustrated in Example 1.

The inventors of the present invention have found that several kinds of alkenylamines formed by the reactions of alkylamines with butadiene are an essential requirement that will exert the most decisive influence upon the microstructure of the polymers of butadiene in the presence of an alkali metal or an alkali metal-graphite.

Basing on this discovery, inventors have tried to carry out a polymerization of butadiene in the absence of a solvent using an alkali metal including an alkali metal supported on an appropriate carrier or a complex of an alkali metal-graphite and an alkylamine or an alkenylamine as catalyst and have succeeded in obtaining a white, solid polymer having above 95 percent of trans-1,4-structure and a crystallinity in excess of 60 percent measured by an X-ray diffraction method. The polymer obtained according to this process suitable to be worked out easily for films or fibers.

Said alkali metal which constitutes the catalyst used in this invention may be K, Na, Rb or Cs which can be used by dispersing them on a carrier, such as alumina, silica, active carbon, diatomaceous earth or other appropriate carriers; said alkali metal-graphite complex, for example, a potassium-graphite complex is a pulverulent complex compound having a composition designated as $C_8K$ or $C_{24}K$ and so on as described in the literatures (G. R. Henning, Prog. Inorg. Chem. 1 125 (1966)); said compound can be prepared by heating graphite and potassium under a reduced pressure or in an inert gas atmosphere. As graphite used in this invention, in addition to graphite having a graphitization degree of 100 percent, a partly graphitized carbonaceous material having above about 10 percent graphitization degree may also be used. Preferred alkylamines are secondary and tertiary amines, and preferred alkenylamines are formed by a reaction of corresponding alkylamine with a conjugated diene, such as butadiene or isoprene, and the trans-alkenylamines are most preferable. The alkyl and alkenyl groups contain 1 to 20 carbon atoms, respectively. In order to realize the process of this invention, an alkali metal component and an alkylamine or alkenylamine component are charged into an appropriate vessel under a reduced pressure or in an atmosphere of an inert gas, for instance, nitrogen and butadiene are added thereto under an ordinary pressure or under an elevated pressure, resulting in formation of poly-1,4-trans-butadiene in the form of white crystals several hours later.

A polymerization of butadiene should preferably be carried out under substantially anhydrous conditions. Further, the weight ratio of the alkali metal component to the amine component is adopted in wide range, preferably 10 : 1–1 : 10. The reaction temperature is generally in the range of from −20° to 70°C, more preferably −10° to 50°C. If a polymerization of butadiene is carried out under these conditions, the generated butadiene polymer is white crystals which can be easily separated from reaction products. However, it is also possible to prepare a product by filtering insoluble components such as graphite and alkali metal oxides from a solution of the product in benzene.

Figure 2:
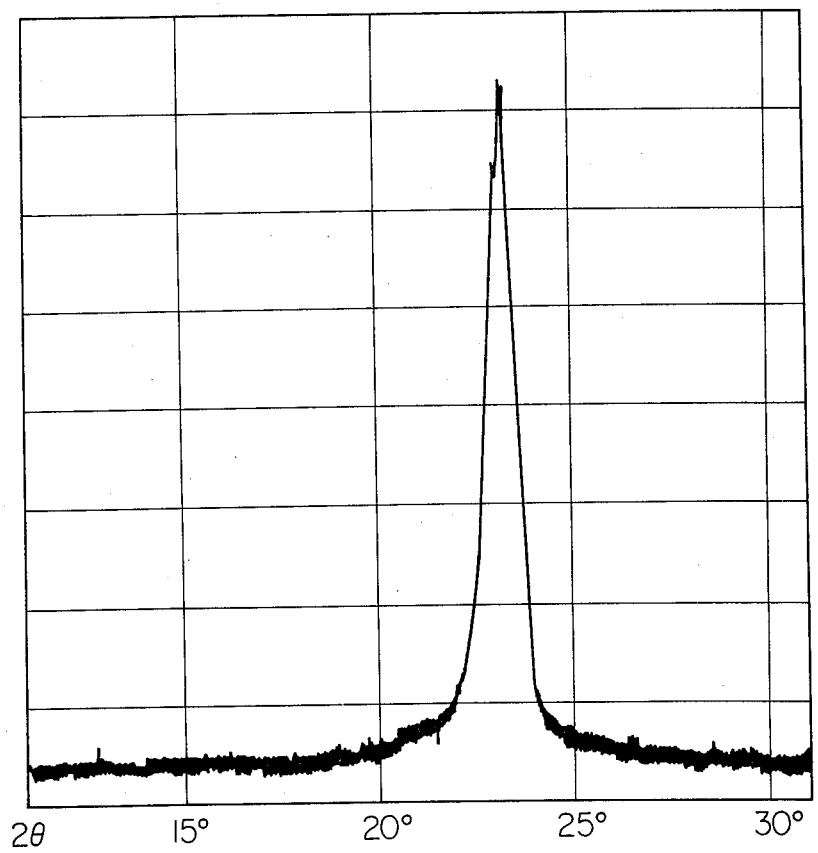
FIG. 2 shows the analytical results obtained by means of an X-ray diffraction method in order to produce crystalline poly-1,4-trans butadiene according to the method illustrated in Example 1.

When a microstructure of the polymer of butadiene is analyzed by an infrared spectroscopic method proposed by D. Morero et al. (La Chimica e Industria XLI-8-1959, 758p), it was found that solid polybutadiene substantially contained above 95 percent of a trans-1,4-structure (refer to FIG. 1), and a sharp peak elucidated by an X-ray diffraction method was found in the neighborhood of $2\theta = 23.2°$ (refer to FIG. 2). From a width of said X-ray spectrum the crystallinity of the product was found to be in the excess of 60 percent. Although FIGS. 1 and 2 illustrate examples relating to a polymer obtained in the method described in Example 1, polymers obtained in the other examples have similar characteristics and structure as given in FIGS. 1 and 2.

The working mode of the present invention will be explained further in detail by means of the following examples, but they are given hereunder strictly for the purpose of illustrating only some of the essential requirements of this invention.

EXAMPLES 1 to 6

0.005 Mole of metallic potassium was charged into a reaction vessel under an atmosphere of nitrogen, and 0.2 mole of several amines were added thereto. Polymerization was initiated when 2.2 g butadiene was introduced thereinto at an ordinary pressure while subjected to stirring. After some introduction period the reaction liquid turned into reddish-brown, and in several hours an almost complete polymerization of butadiene was attained. The obtained white polymerized substance was separated, and the microstructure thereof was analyzed by Morero Method. Results are summarized in Table 1.

REFERENCE EXAMPLES 1-3

Reactions were carried out using the same conditions as described in Example 1 except that only $C_8K$ or only metallic potassium was used as catalyst and n-heptane or tetrahydrofuran (THF) was used as a solvent. Results as summarized in Table 2 hereunder were obtained.

Table 2

| Ref. Ex. | Catalysts | Solvents | Temperature (°C) | Yield of polymer (g) | Microstructure(%) | | |
|---|---|---|---|---|---|---|---|
| | | | | | 1,2- | trans-1,4- | cis-1,4- |
| 1 | $C_8K$ | n-Hexane | 25 | 2.0 | 52 | 36 | 12 |
| 2 | K | n-Hexane | 25 | 1.9 | 53 | 40 | 7 |
| 3 | K | THF | 25 | 2.0 | 83 | 17 | 0 |

EXAMPLES 7-12

Polymerization of butadiene was carried out by dispersing 0.2 g of potassium and 0.2 g of $C_8K$ complex supported on 0.2 g of metallic potassium and 1 g of $\gamma$-$Al_2O_3$ (the surface area 190 m²/g) in 0.2 mole of several kinds of alkenylamine in accordance with the same method as described in Example 1. Polymeric substances having microstructures as summarized in Table 3 were obtained.

Table 3

| Examples | Catalysts | Temperature(°C) | Yield of polymer (g) | Microstructure (%) | | |
|---|---|---|---|---|---|---|
| | | | | 1,2- | trans-1,4- | cis-1,4 |
| 7 | $C_8K$+trans—$Et_2NCH_2CH=CHCH_3$ ($\gamma$-Alumina) | 25 | 1.6 | 3 | 95 | 2 |
| 8 | $C_8K$+$Et_2NCH_2CH$—$CH=CH_2$ | 25 | 1.8 | 2 | 96 | 2 |
| 9 | K+$Et_2N$—$CH_2$—$CH$—$CH=CH_2$ with $CH_2$—$CH=CHCH_3$ branch | 25 | 1.8 | 2 | 96 | 2 |
| 10 | K+trans $NCH_2CH=CHCH_3$ (with $CH_2CH=CHCH_2$) | 25 | 2.0 | 37.0 | 60.0 | 3 |
| 11 | K+trans $NCH_2CH=CHCH_3$ | 25 | 2.1 | 36.0 | 60.0 | 4 |
| 12 | K+trans-$Et_2NCH_2CH=CH$—$CH_3$ | 25 | 1.8 | 7 | 92 | 1 |

EXAMPLES 13-15

Metallic potassium was dispersed in several alkylamines in accordance with the same method as described in Example 1, and butadiene was introduced Table 1

| Examples | Catalysts | Temperature (°C) | Yield of Polymer (g) | Microstructure (%) | | |
|---|---|---|---|---|---|---|
| | | | | 1,2- | trans-1,4- | cis-1,4- |
| 1 | K+trans $Et_2NCH_2CH=CHCH_3$ | 25 | 1.7 | 2 | 96 | 2 |
| 2 | K+Cis $Et_2NCH_2CH=CHCH_3$ | 25 | 1.6 | 4 | 93 | 3 |
| 3 | K+trans(n-Pro)$_2NCH_2CH=CHCH_3$ | 25 | 1.2 | 4 | 95 | 1 |
| 4 | K+trans(Iso-Pro)$_2NCH_2CH=CHCH_3$ | 25 | 0.9 | 6 | 92 | 2 |
| 5 | K+trans-(IsoBut)$_2NCH_2CH=CHCH_3$ | 25 | 0.8 | 7 | 91 | 2 |
| 6 | K+trans(nBut)$_2NCH_2CH=CHCH_3$ | 25 | 0.7 | 6 | 92 | 2 |

In Tables Et expresses an ethyl group, Pr a propyl group and But a butyl group.

therein. A formation of alkenylamine was observed in the earlier stage of the reaction accompanied by a consumption of butadiene. A polymerization was initiated after about 1 hour.

A white, crystalline polymer and a rubber-like substance were obtained. The results are summarized in Table 4.

solvent like benzene and toluene at room temperature, but was soluble in a hot solvent in the neighborhood of the boiling point thereof, for instance in toluene at 100°C. As reference Examples, results of the polymerization of butadiene by Na or $C_{24}Na$ in the absence of an alkylamine or alkenylamine are summarized in Table 6.

Table 6

| Reference Examples | Catalysts | Temperature(°C) | Yield of polymer (g) | Microstructure(%) | | |
|---|---|---|---|---|---|---|
| | | | | 1,2- | trans-1,4- | cis-1,4- |
| 4 | Na/n-Hexane (liquid polymer) 0.2 g | 25 | 2.1 | 65 | 25 | 10 |
| 5 | Na/THF (liquid polymer) 0.2 g | 25 | 1.7 | 91 | 9 | 0 |
| 6 | $C_{24}$Na/n-Hexane (liquid polymer) 0.2 g | 25 | 1.8 | 58 | 31 | 11 |

Table 4

| Ex. | Catalysts | Temp. (°C) | Yield of polymer (g) | Microstructure(%) | | |
|---|---|---|---|---|---|---|
| | | | | 1,2- | trans-1,4- | cis-1,4- |
| 13 | K + (Et)$_2$NH 0.2g 0.1 mole | 25 | 0.45 | 4 | 94 | 2 |
| 14 | K + (n-Pr)$_2$NH 0.2 g 0.11 mole | 25 | 0.30 | 8 | 91 | 1 |
| 15 | K + (n-But)$_2$NH 0.2g 0.1 mole | 25 | 0.16 | 5 | 90 | 5 |

In Table 4 Et expresses an ethyl group, Pr a propyl group, and But a butyl group.

EXAMPLES 16-19

1.0 part of metallic sodium was charged in a reaction vessel under a reduced pressure (about $10^{-1}$ cmHg), and 0.2 part each of several amines was added thereto. A polymerization was initiated when butadiene was introduced therein under normal pressure with stirring. After some introduction period, the reaction liquid becomes reddish-brown, and the polymerization of butadiene was almost completed after several hours. The obtained white crystalline polymer was separated from the solid catalyst and the microstructure thereof was analyzed by the Morero Method. The results are summarized in Table 5. The obtained solid polymer was found to be a crystalline polybutadiene having an outstandingly high peak at $2\theta = 23.2°$ in the X-ray diffraction pattern.

Further, the softening point thereof was found to be 150° to 180°C. Said polymer was almost insoluble in

EXAMPLES 20-21

Metallic rubidium or cesium was dispersed in several alkylamines in accordance with the same method as described in Example 13, and butadiene was introduced therein. Accompanied by a rapid consumption of butadiene in an earlier stage of the reaction, a formation of alkenylamine was observed. The polymerization was initiated after about 1 hour and a white crystalline polymer and a rubber-like substance were obtained. The results are summarized in Table 7. The properties of said white crystalline polymer was same as that obtained in Example 13, but the microstructure of said rubber-like substance consists of 60 to 65 percent trans-1,4-structure, and 30 to 40 percent, 1,2-structure.

Table 7

| Ex. | Catalysts | Temp. (°C) | Yield of solid polymer (g) | Microstructure(%) | | |
|---|---|---|---|---|---|---|
| | | | | 1,2- | trans-1,4- | cis-1,4- |
| 20 | Rb + (C$_2$H$_5$)$_2$NH 0.2g 0.2 mole | 25 | 0.4 | 4 | 94 | 2 |
| 21 | Cs + (C$_3$H$_7$)$_2$NH 0.2g 0.2 mole | 25 | 0.5 | 7 | 89 | 4 |

What is claimed is:
1. A process for preparing polybutadiene of predominantly trans 1,4 structure which comprises:
    polymerizing butadiene in the presence of a catalyst consisting of:
    1. a metal selected from the group consisting of sodium, potassium, rubidium and cesium, and

Table 5

| Examples | Catalysts | Temperature(°C) | Yield of solid polymer(g) | Microstructure (%) | | |
|---|---|---|---|---|---|---|
| | | | | 1,2- | trans-1,4- | cis-1,4- |
| 16 | Na + cis—1,4—Et$_2$N—CH$_2$—CH=CH—CH$_3$ 2g 0.2 mole | 25 | 0.6 | 4 | 95 | 1 |
| 17 | Na + trans—1,4—Et$_2$NCH$_2$—CH=CH—CH$_3$ 2g 0.2 mole | 25 | 0.8 | 2 | 96 | 2 |
| 18 | Na + trans—(isoPr)$_2$N—CH$_2$—CH=CH—CH$_3$ 2g 0.2 mole | 25 | 1.1 | 4 | 95 | 1 |
| 19 | Na + Et$_2$N—CH$_2$—CH—CH=CH$_2$<br>                CH$_2$—CH=CH—CH$_3$<br>2g 0.2 mole | 25 | 1.0 | 5 | 90 | 5 |

2. an alkylamine or an alkenylamine
in an atmosphere at a temperature of from −20°C to 70°C at the weight ratio of metal to alkylamine or alkenylamine being about 1:10–10:1.

2. A process for preparing polybutadiene of predominantly trans 1,4 structure which comprises:
polymerizing butadiene in the presence of a catalyst consisting of a metal selected from the group consisting of sodium, potassium, rubidium and cesium,
graphite, and
an alkylamine or an alkenylamine
in an atmosphere of from −20° to 70°C at the weight ratio of metal-graphite complex to alkylamine or alkenylamine being about 1:10–10:1.

* * * * *